US012711686B2

(12) United States Patent
Volkan et al.

(10) Patent No.: US 12,711,686 B2
(45) Date of Patent: Aug. 18, 2026

(54) AVATAR UI WITH MULTIPLE SPEAKING ACTIONS FOR SELECTED TEXT

(71) Applicant: Samsung Electronics Co., Ltd., Suwon-si (KR)

(72) Inventors: Erkan Volkan, Lodi, NJ (US); Siva Penke, San Jose, CA (US); Siva Boggala, San Ramon, CA (US); Laszlo Gombos, Winchester, MA (US); Jisun Park, Palo Alto, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 161 days.

(21) Appl. No.: 18/223,195

(22) Filed: Jul. 18, 2023

(65) Prior Publication Data

US 2024/0087199 A1 Mar. 14, 2024

Related U.S. Application Data

(60) Provisional application No. 63/404,898, filed on Sep. 8, 2022.

(51) Int. Cl.
*G06T 13/40* (2011.01)
*G06T 13/20* (2011.01)
(Continued)

(52) U.S. Cl.
CPC ............ *G06T 13/40* (2013.01); *G06T 13/205* (2013.01); *G06T 17/00* (2013.01); *G10L 13/02* (2013.01); *G10L 13/08* (2013.01)

(58) Field of Classification Search
CPC ....... G06T 13/40; G06T 13/205; G06T 17/00; G10L 13/02; G10L 13/08; G10L 13/00;
(Continued)

(56) References Cited

U.S. PATENT DOCUMENTS 6,250,928 B1 * 6/2001 Poggio .................. G09B 19/04 434/167
8,990,087 B1 3/2015 Lattyak
(Continued)

FOREIGN PATENT DOCUMENTS

KR 20110054452 A 5/2011
KR 101400636 B1 5/2014
KR 20220099344 A 7/2022

OTHER PUBLICATIONS

Speak It (https://chrome.google.com/webstore/detail/speak-it/amcnjejmdfilapnnfgnhnidhkififadk).
(Continued)

*Primary Examiner* — Sheree N Brown

(57) ABSTRACT

In one embodiment, a method includes determining, by a client computing device, that a user has selected text displayed on a display of the client computing device. The method further includes presenting, in response to the determination, a UI element on the display of the client computing device. The UI element includes a plurality of selectable portions, each associated with a distinct speaking action for a 3D avatar to perform with respect to the selected text. In response to the user's selection, the method includes presenting on the display of the client computing device an animation of the 3D avatar performing a speaking action corresponding to the selected portion; and providing, by the client computing device, speech audio synchronized with the speaking action of the animated 3D avatar.

20 Claims, 6 Drawing Sheets

(51) Int. Cl.
*G06T 17/00* (2006.01)
*G10L 13/02* (2013.01)
*G10L 13/08* (2013.01)

(58) Field of Classification Search
CPC ............... G06F 3/04817; G06F 3/0482; G06F 3/04842; G06F 3/0488; G06N 3/006; G06N 3/0455
USPC .......................................................... 345/473
See application file for complete search history.

(56) References Cited

U.S. PATENT DOCUMENTS 9,449,523 B2 9/2016 Dougherty
9,691,296 B2 * 6/2017 Hoque .................. G09B 5/065
9,812,151 B1 * 11/2017 Amini .................... G06T 13/40
10,360,716 B1 7/2019 van der Meulen
10,446,055 B2 * 10/2019 Gupta .................. G10L 15/187
10,521,946 B1 * 12/2019 Roche .................... G10L 13/00
10,585,563 B2 3/2020 Cohn
10,586,369 B1 * 3/2020 Roche .................. G06T 13/205
10,991,360 B2 4/2021 Bangalore
11,128,586 B2 9/2021 Al Majid
11,270,487 B1 * 3/2022 Steptoe ................ G06V 40/171
11,282,497 B2 3/2022 Wang
11,443,646 B2 9/2022 German
2005/0125229 A1 * 6/2005 Kurzweil ............... G06Q 30/02 704/270
2006/0009978 A1 * 1/2006 Ma ........................ G06T 13/40 704/E21.02
2010/0085363 A1 * 4/2010 Smith .................... H04N 5/262 345/473
2012/0165618 A1 * 6/2012 Algoo .................... A61B 5/744 600/300
2013/0002708 A1 1/2013 Raffle
2013/0073957 A1 * 3/2013 DiGiantomasso ..... G06Q 50/20 715/705
2014/0157153 A1 6/2014 Yuen
2015/0194146 A1 * 7/2015 Wu .................. H04N 21/47205 386/285
2016/0274686 A1 * 9/2016 Alonso Ruiz ....... G06F 3/04842
2016/0274761 A1 * 9/2016 Alonso Ruiz ........... G06F 3/016
2018/0144761 A1 * 5/2018 Amini .................... G06V 20/40
2018/0151087 A1 * 5/2018 Wise ........................ G09B 5/06
2018/0253881 A1 * 9/2018 Edwards ................. G10L 21/10
2020/0034025 A1 1/2020 Brady
2021/0248804 A1 8/2021 Hussen Abdelaziz
2021/0358188 A1 * 11/2021 Lebaredian ............. G06F 3/167
2023/0343239 A1 * 10/2023 Kim ......................... G09B 5/06
2024/0087199 A1 * 3/2024 Volkan .................. G06T 13/205
2024/0296753 A1 * 9/2024 Gogin .................... G09B 19/06

OTHER PUBLICATIONS

Amazon text-to-speech (https://www.amazon.com/gp/help/customer/display.html?nodeId=201829850).
Speechify (https://speechify.com/?utm_source=google&utm_medium=cpc&utm_campaign=search-alpha&utm_content-pdf-reader&utm term=text%20reader&gc_id=14319260866&h_ad_id=605017615864&gclid=CjwKCAjw9NeXBhAMEiwAbaY4lrEkA0DXqN6wERY4SEbGenHS7o325lwx2SFJn_r0EQvvYrVrldVVYxoCgAwQAvD_BwE).
Google text-to-speech (https://cloud.google.com/text-to-speech).
How to use Google text-to-speech on your Android phone to hear text instead of reading it by Devin Delfino, Business Insider (https://www.businessinsider.com/guides/tech/how-to-use-google-text-to-speech).
The 7 Best Text-to-Speech Apps for Android by Dan Price, Make Use Of (https://www.makeuseof.com/tag/android-talks-back-4-voice-apps-for-text-to-speech/).
How to make mobile Chrome browser on Android read web text out loud to you by Daniel P., Phone Arena (https://www.phonearena.com/news/How-to-make-mobile-Chrome-browser-on-Android-read-web-text-out-loud-to-you_id50530).
Need a Talking Avatar? Here Are 10 Options To Go With by Iveta Pavlova, Graphic Mama (https://graphicmama.com/blog/need-a-talking-avatar-here-are-your-options/).

* cited by examiner

AVATAR UI WITH MULTIPLE SPEAKING ACTIONS FOR SELECTED TEXT

PRIORITY CLAIM

This application claims the benefit under 35 U.S.C. § 119 of U.S. Provisional Patent Application 63/404,898 filed Sep. 8, 2022, which is incorporated by reference herein.

TECHNICAL FIELD

This application generally relates to an avatar user interface (UI) with multiple speaking actions for selected text.

BACKGROUND

In computing, an avatar is a graphical representation of a person. Avatars often appear with human-like representations, but may take animal representations as well. In some circumstances, avatars may have a customizable appearance. An avatar can take a two-dimensional (2D) form, such as in a profile picture. An avatar can also take a three-dimensional (3D) form. Avatars can be static or can be dynamic, and 3D avatars are often dynamic in that they can be animated so as to move, talk, change facial expressions, and represent a variety of other actions, emotions, or poses.

DESCRIPTION OF EXAMPLE EMBODIMENTS

Figure 1:
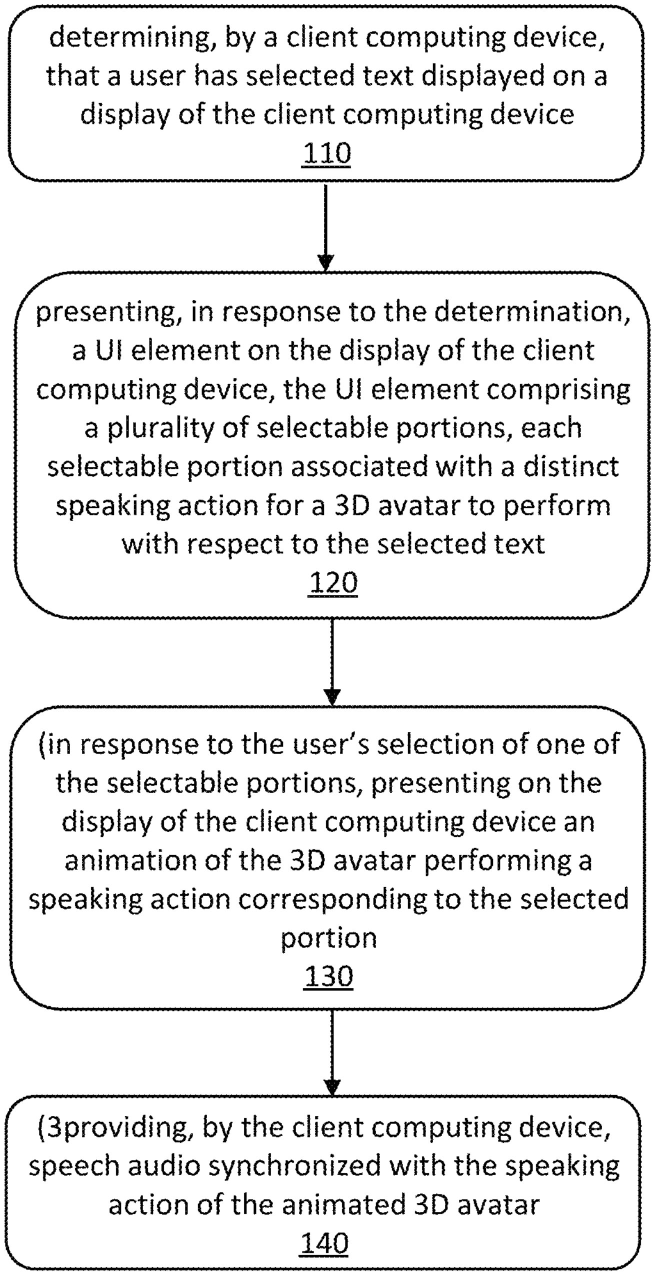
FIG. 1 illustrates an example method of providing a 3D avatar with a variety of user-selectable speaking actions in response to a user selecting text displayed on a device's display.

FIG. 1 illustrates an example method of providing a 3D avatar with a variety of user-selectable speaking actions in response to a user selecting text displayed on a device's display. For example, a user may be viewing content on a smartphone, smartwatch, tablet, laptop, computer monitor, an extended-reality system (e.g., a head-mounted device) that displays virtual content and/or real content, or any other suitable client device. The viewed content may include text, which may be displayed via a web browser or an application such as a messaging application, a reading application, etc. A user can select text, for example by touching and holding a portion of text on a touch sensitive display, by using a human-interface device such as a computer mouse, or any other suitable method for selecting text.

Step 110 of the example method of FIG. 1 includes determining, by a client computing device, that a user has selected text displayed on a display of the client computing device. The client computing device may be any suitable client device, include the example client devices discussed above. In particular embodiments, step 110 may include determining that a user has initiated a text-selection process. For example, step 110 may include determining that a user has touched and held a touch-sensitive display for sufficient time to enable display of a selection tool, such as a movable beginning cursor and ending cursor. In particular embodiments, step 110 may include determining that a user is in the process of selecting text. For example, a user may have initiated a text-selection process and may be adjusting selected text, for example by moving a text-selection cursor associated with the selection process. In particular embodiments, step 110 may include determining that a user has finished text selection. For example, a user may have initiated a text-selection process and then specified the exact text to select, for example by dragging and releasing one or more text-selection cursors. As discussed herein, the selected text may be part of a webpage, may be text displayed on an application, or may be any other suitable text.

Figure 2:
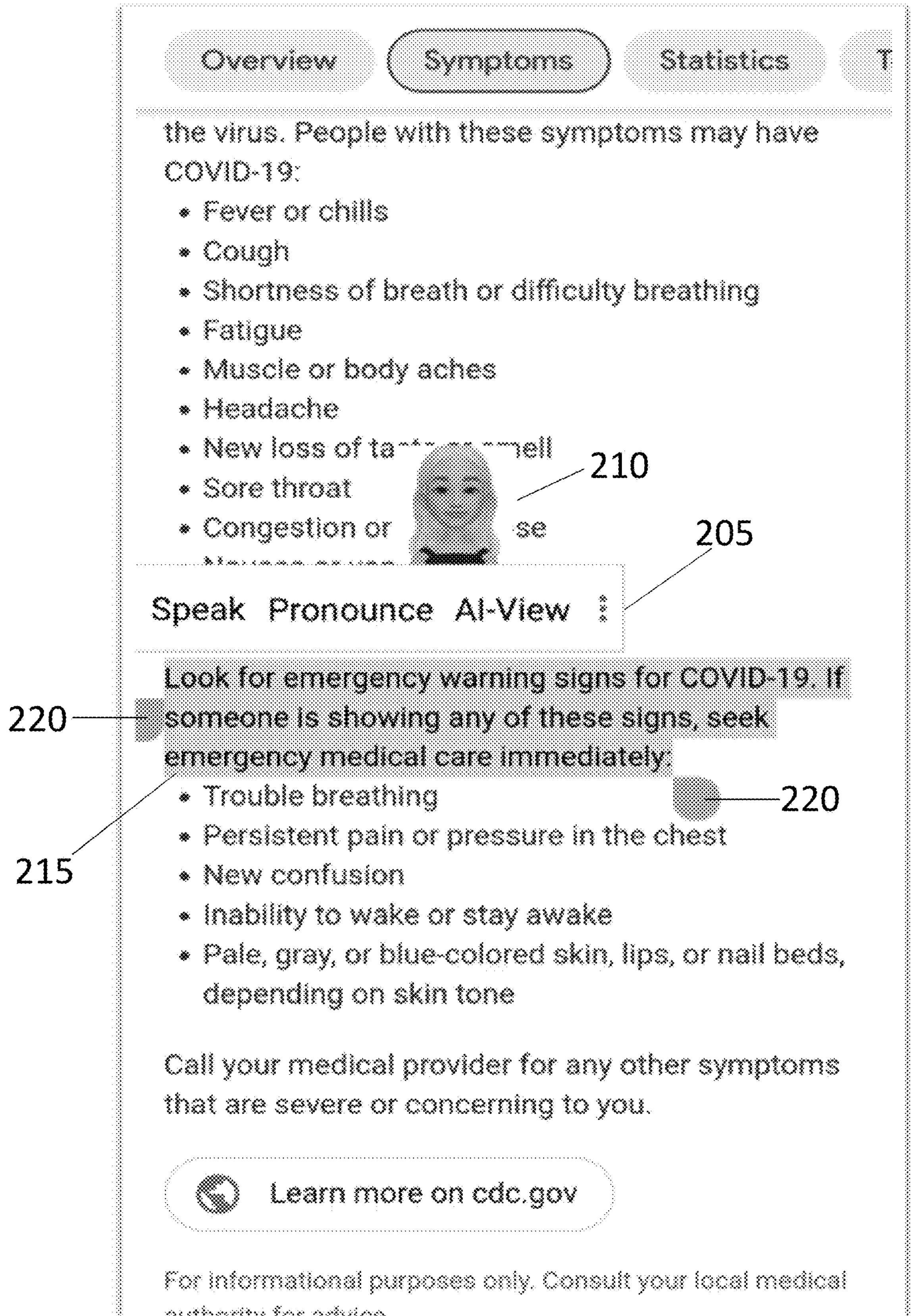
FIG. 2 illustrates an example UI.

Step 120 of the example method of FIG. 1 includes presenting, in response to the determination of step 110, a UI element on the display of the client computing device. Here, the UI element includes multiple selectable portions, and each selectable portion is associated with a distinct speaking action for a 3D avatar to perform with respect to the selected text. FIG. 2 illustrates an example UI element 205. As displayed, UI element 205 includes three selectable portions: a "Speak" portion, a "Pronounce" portion, and an "AI-View" portion. As explained herein, each of these portions correspond to a distinct speaking action for a 3D avatar. In particular embodiments, a UI element may include a selectable portion, such as the three vertical dots of UI element 205 in FIG. 2, that provides access to additional selectable content, such as additional selectable portions related to additional actions, and/or to an option that dismisses or moves the UI element.

In the example of FIG. 2, an avatar 210 is displayed along with UI element 205. In particular embodiments, avatar 210 may be the same avatar that is subsequently used to perform a speaking action. In particular embodiments, an avatar used to perform a speaking action may be different than avatar 210 displayed along with UI element 205. For example, the two avatars may take different sizes, or may have entirely different appearances.

The example of FIG. 2 illustrates selected text 215 and adjustable selection cursors 220. As discussed above, UI element 205 may initially be provided when a user initiates a text-selection function, when the user begins selecting text, or when the user manipulates (e.g., selects and releases) a cursor 220.

Step 130 of the example method of FIG. 1 includes, in response to the user's selection of one of the selectable portions, presenting on the display of the client computing device an animation of the 3D avatar performing a speaking action corresponding to the selected portion. Step 140 of the example method of FIG. 1 includes providing, by the client computing device, speech audio synchronized with the speaking action of the animated 3D avatar.

Figures 3A, 3B:
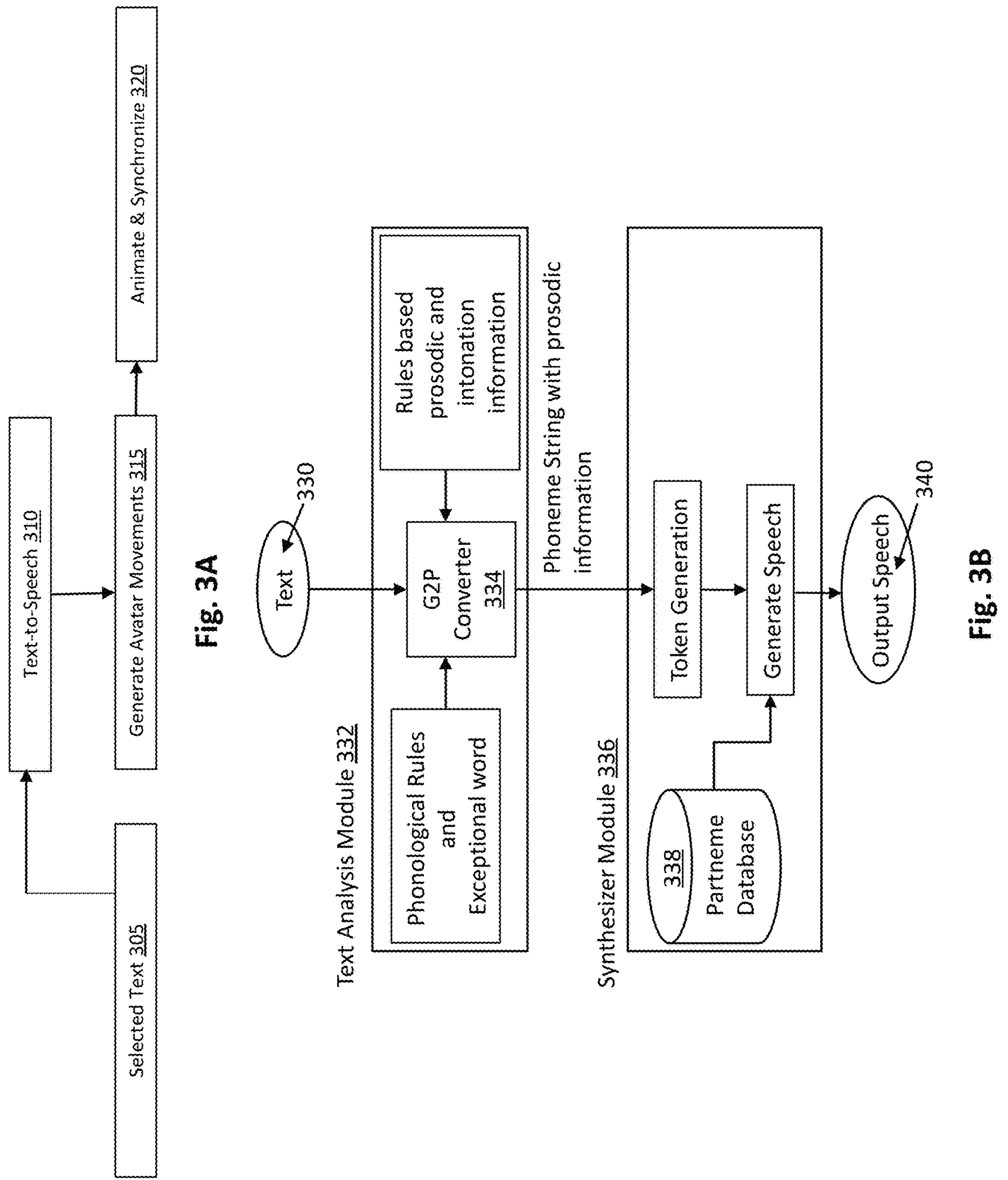
FIG. 3A and FIG. 3B illustrate an example architecture for converting text-to-speech audio and animating the 3D avatar.

FIG. 3A and FIG. 3B illustrate an example architecture for converting text-to-speech audio and animating the 3D avatar. As illustrated in FIG. 3A, the selected text 305 is accessed, for example via an API for the web browser or other application in which the text is being displayed. The text is input to a text-to-speech module 310, which parses the text and generates an audio file of the spoken text. In particular embodiment, the text-to-speech module may also generate, from the text, data required for viseme and avatar animation.

FIG. 3B illustrates an example text-to-speech module, although this disclosure contemplates that any suitable textto-speech module may be used. In the example of FIG. 3B, text 330 is first sent to a text analysis module 332, which uses phonological rules and exceptions, along with rule-based prosodic and intonation information, as inputs to grapheme-to-phoneme (G2P) converter 334. The output of the text analysis module is a phoneme string with prosodic information for the input text. Then, a synthesizer module 336 takes the output of the text analysis module and generates tokens. In this example, these tokens are used to synthesize speech in connection with an Epoch Synchronous Non Overlap Add (ESNOLA) technique to select smaller, fundamental parts of the phoneme, also referred to as partnemes, which are stored in a partneme database 338. The synthesized speech is then output by synthesizer module 336 as output speech 340.

After the text-to-speech module 310 generates synthesized speech from text, the example architecture of FIG. 3A generates avatar movements 315. For example, this module may include a sentiment analyzer that classifies the text sentiment, for example using one or more of n emotion labels from an emotions database. This module may also generate lipsync data and related data for animating a facial expression of an avatar. The architecture of FIG. 3A includes an aminate and synchronize block 320, which takes the output from the text-to-speech module 310 and the generate avatar movements module 315 to animate the 3D avatar with movement synchronized to the synthesized speech for the text input. While FIGS. 3A and 3B illustrate example architectures for converting text to audible speech and animating an avatar, this disclosure contemplates that any suitable architecture or approaches may be used.

Figure 4:
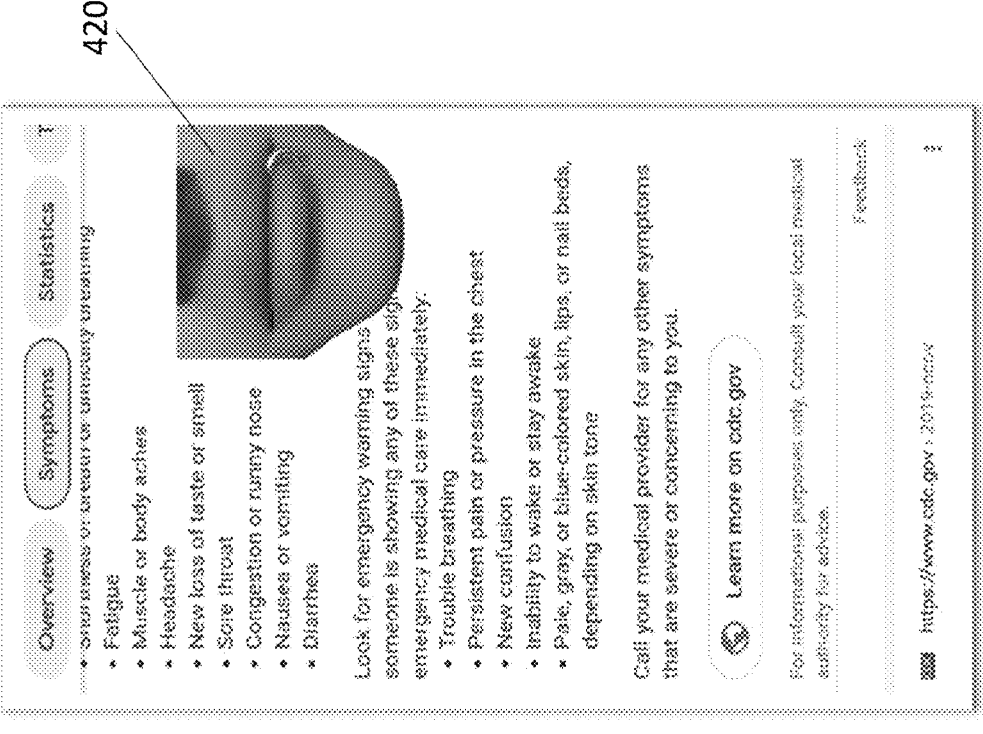
FIG. 4 illustrates an example of different presentations of a 3D avatar during different actions.

In particular embodiments, a UI element may include a "speak" portion that corresponds to a speak action. The speak action results in a 3D avatar speaking out-loud the selected text. In particular embodiments, a UI element may include a "pronounce" portion that corresponds to a pronounce action. In this action, the presentation of the 3D avatar focuses on the mouth in order to illustrate how to pronounce the selected text. In particular embodiments, a pronounce action may include a slower speech rate than a speak action. FIG. 4 illustrates an example of the different presentations of a 3D avatar during a speech action (avatar 410) and a 3D avatar during a pronounce action (avatar 420). As illustrated in FIG. 4, the presentation of avatar 420 focuses much more on the avatar's mouth, so that a user can observe the mouth movements in addition to hearing the spoken word(s), for example in order to better understand how to pronounce the selected text.

While FIG. 4 illustrates examples of 3D avatars, this disclosure contemplates that a 3D avatar may be presented with any suitable characteristics, which may be customized by the user. In addition, the user may associate different avatar appearances with different speech actions. In particular embodiments, an avatar may be presented with some or all of an avatar body, in addition to an avatar face. In particular embodiments, a user may select the avatar and change the view of the 3D avatar, e.g., to view the avatar from a different perspective while the avatar performs the speaking action.

Figure 5:
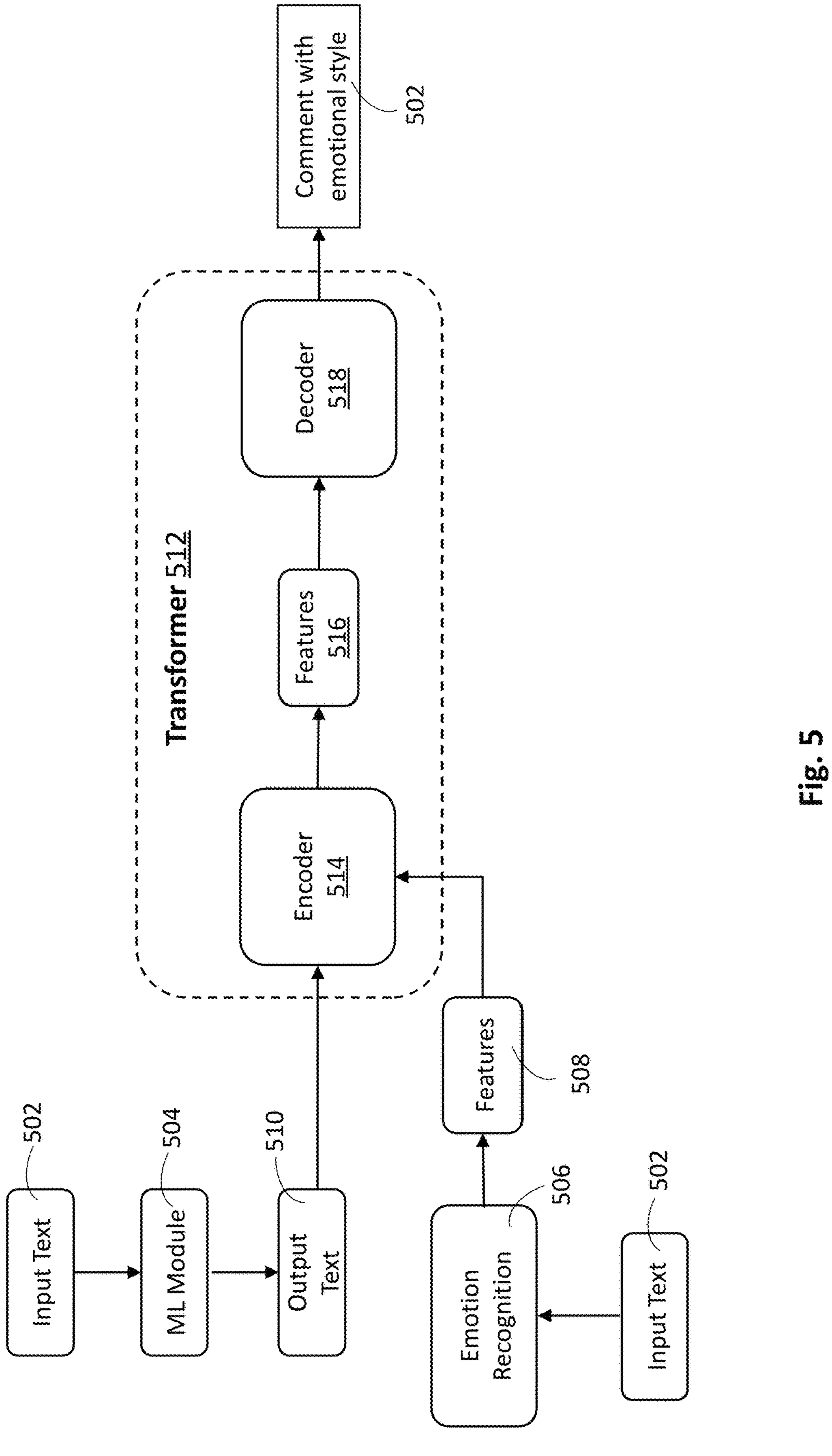
FIG. 5 illustrates an example process for creating an AI-generated comment based on selected text.

In particular embodiments, a UI element may include an "AI-View" portion that corresponds to an AI-generated action. For example, the AI-View action may generate and speak a comment related to the input text, with an emotional tone corresponding to the text's sentiment. FIG. 5 illustrates an example process for generating the comment. As illustrated in FIG. 5, input text 502 is provided to a trained machine-learning model 504. The input text 502 may be the selected text, or may include additional text, such as all text on a webpage. The machine-learning model 504 may be, for example, a natural-language model that generates output text corresponding to the input text. For example, if the input text is "plagued by drought, California is now soaked after 12 monstrous storms," the output text may be "Wow, hope everyone in California is safe." As illustrated in the example of FIG. 5, the input text 502 is also provided to an emotion recognition module 506, which generates an embedding vector (i.e., features 508) representing the emotional content of the input text. The features 508 and the text output 510 by the ML model 504 may be fed as input to a transformer module 512, which uses an encoder 514 to extract features 516 from the combined input. The decoder 518 of the transformer module 512 receives these features 516 and outputs the comment 520 for the avatar to speak, along with the corresponding emotional style with which to speak the comment. In particular embodiments, the comment may not be identical to the output text from the machine-learning module, although in this example, the transformer tends to preserve the information in that output text. In particular embodiments, after speaking the generated comment, the avatar may then speak the selected text.

In particular embodiments, a UI element may include a "read-from-here" portion that corresponds to an action in which the 3D avatar reads from the beginning of the selected text to the end of the document. For example, the end of the document may be the end of an article displayed on a webpage, or the end of a chapter in an e-book. In particular embodiments, a UI element may include a "share" portion that corresponds to a sharing action for sharing content with other users. For example, the sharing action may record a clip of the avatar performing another speaking action (e.g., an action subsequently selected or previously selected by a user), for example a clip in an .mp4 format. In particular embodiments, the screen content is captured along with the recorded avatar content. In particular embodiments, after content is recorded, other pop-up buttons may surface, for example buttons for sharing the content on particular social-media applications or chat applications, etc.

Particular embodiments may repeat one or more steps of the method of FIG. 1, where appropriate. Although this disclosure describes and illustrates particular steps of the method of FIG. 1 as occurring in a particular order, this disclosure contemplates any suitable steps of the method of FIG. 1 occurring in any suitable order. Moreover, although this disclosure describes and illustrates particular components, devices, or systems carrying out particular steps of the method of FIG. 1, such as the computer system of FIG. 6, this disclosure contemplates any suitable combination of any suitable components, devices, or systems carrying out any suitable steps of the method of FIG. 1. Moreover, this disclosure contemplates that some or all of the computing operations described herein, including the steps of the example method illustrated in FIG. 1, may be performed by circuitry of a computing device, for example the computing device of FIG. 6, by a processor coupled to non-transitory computer readable storage media, or any suitable combination thereof.

Figure 6:
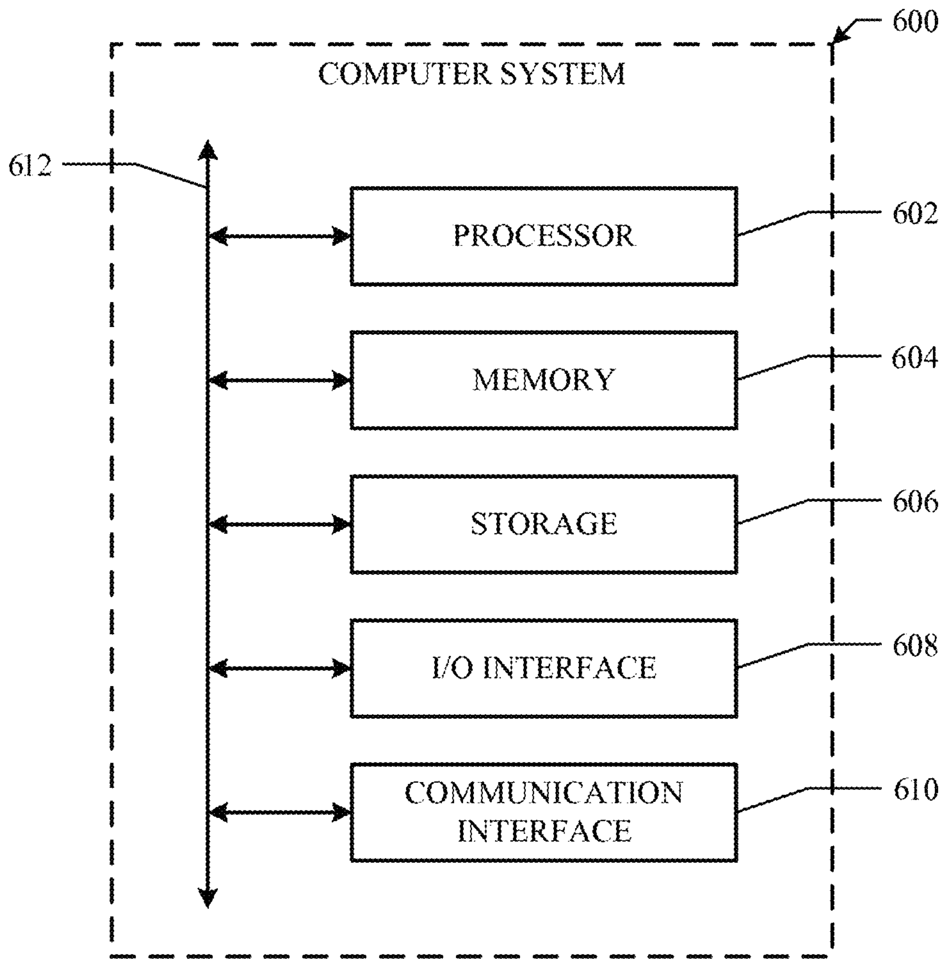
FIG. 6 illustrates an example computing device.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 406, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 406; decode and execute them; and then write one or more results to an internal register, an internal cache, memory 604, or storage 406. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 406, and the instruction caches may speed up retrieval of those instructions by processor 602. Data in the data caches may be copies of data in memory 604 or storage 406 for instructions executing at processor 602 to operate on; the results of previous instructions executed at processor 602 for access by subsequent instructions executing at processor 602 or for writing to memory 604 or storage 406; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 406 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 406 or elsewhere) and operates only on data in one or more internal registers or internal caches or in memory 604 (as opposed to storage 406 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 600, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 602 and storage 406, where appropriate. Where appropriate, storage 406 may include one or more storages 406. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend.

What is claimed is:

1. A method comprising:

displaying text on a display of a client computing device;

after displaying the text on the display of the client computing device, then determining, by a processor of the client computing device detecting a text-selection function comprising at least one of (1) a user interaction with the display of the client computing device or (2) an input to the client computing device by a human-interface device, that a user has selected at least a portion of the text already being displayed on the display of the client computing device;

presenting, in response to the determination that the user has selected text already being displayed on the display of the computing device, a UI element on the display of the client computing device, the UI element comprising a plurality of selectable portions, each selectable portion associated with a distinct speaking action for a 3D avatar to perform with respect to the selected text when that respective selectable portion is selected by the user, wherein (1) the UI element is displayed only after the user has selected the text already being displayed on the display of the client computing device and (2) the UI element lets the user select, via the plurality of selectable portions, which distinct speaking action the 3D avatar will perform regarding the text selected by the user, in response to the user's selection of a particular one of the plurality of selectable UI portions corresponding to a speaking action, presenting on the display of the client computing device an animation of the 3D avatar performing the speaking action corresponding to the selected portion; and providing, by the client computing device, speech audio synchronized with the speaking action of the animated 3D avatar.

2. The method of claim 1, wherein one of the plurality of distinct speaking actions comprises an AI-view action that corresponds to the 3D avatar speaking a comment generated by a trained machine-learning model from the selected text.

3. The method of claim 2, wherein the AI-view action further corresponds to the 3D avatar speaking the selected text after speaking the generated comment.

4. The method of claim 2, wherein, when the UI element corresponding to the AI-view action is selected, the method further comprises:

providing the selected text to the trained machine learning model;

accessing, from the trained machine learning model, output text paraphrasing the selected text;

generating, from the selected text, one or more feature vectors representing an emotional content of the selected text;

providing the output text and the one or more feature vectors to a transformer model; and receiving, from the transformer model, the comment.

5. The method of claim 1, wherein one of the plurality of distinct speaking actions comprises a speak action that corresponds to the 3D avatar speaking the selected text.

6. The method of claim 1, wherein one of the plurality of distinct speaking actions comprises a pronounce action that corresponds to an enhanced view of the 3D avatar's mouth while speaking the selected text.

7. The method of claim 1, wherein one of the plurality of distinct speaking actions comprises a read-from-here action that corresponds to the 3D avatar speaking the selected text and at least a portion of the subsequent text following the selected text.

8. The method of claim 1, wherein the UI element further comprises a share action that corresponds to recording a video of the 3D avatar performing a speaking action with respect to the selected text.

9. The method of claim 1, wherein the UI element further comprises a second avatar displayed in connection with the plurality of selectable portions.

10. The method of claim 9, wherein the second avatar comprises a relatively smaller view of the 3D avatar.

11. The method of claim 1, wherein the 3D avatar is presented within a threshold distance of the selected text.

12. The method of claim 1, wherein the selected text is displayed on a web browser executing on the client computing device.

13. One or more non-transitory computer readable storage media storing software that is operable when executed by one or more processors to:

display text on a display of a client computing device;

after displaying the text on the display of the client computing device, then determine, by detecting a text-selection function comprising at least one of (1) a user interaction with the display of the client computing device or (2) an input to the client computing device by a human-interface device, that a user has selected at least a portion of the text already being displayed on the display of the client computing device;

present, in response to the determination that the user has selected text already being displayed on the display of the computing device, a UI element on the display of the client computing device, the UI element comprising a plurality of selectable portions, each selectable portion associated with a distinct speaking action for a 3D avatar to perform with respect to the selected text when that respective selectable portion is selected by the user, wherein (1) the UI element is displayed only after the user has selected the text already being displayed on the display of the client computing device and (2) the UI element lets the user select, via the plurality of selectable portions, which distinct speaking action the 3D avatar will perform regarding the text selected by the user;

in response to the user's selection of a particular one of the plurality of selectable UI portions corresponding to a speaking action, present on the display of the client computing device an animation of the 3D avatar performing the speaking action corresponding to the selected portion; and provide speech audio synchronized with the speaking action of the animated 3D avatar.

14. The media of claim 13, wherein one of the plurality of distinct speaking actions comprises an AI-view action that corresponds to the 3D avatar speaking a comment generated by a trained machine-learning model from the selected text.

15. The media of claim 14, wherein the AI-view action further corresponds to the 3D avatar speaking the selected text after speaking the generated comment.

16. The media of claim 14, wherein, when the UI element corresponding to the AI-view action is selected, the software is further operable when executed by one or more processors to:

provide the selected text to the trained machine learning model;

access, from the trained machine learning model, output text paraphrasing the selected text;

generate, from the selected text, one or more feature vectors representing an emotional content of the selected text;

provide the output text and the one or more feature vectors to a transformer model; and receive, from the transformer model, the comment.

17. A system comprising one or more non-transitory computer readable storage media storing instructions; and one or more processors coupled to the non-transitory computer readable storage media, the one or more processors operable to execute the instructions to:

display text on a display of a client computing device;

after displaying the text on the display of the client computing device, then determine, by detecting a text-selection function comprising at least one of (1) a user interaction with the display of the client computing device or (2) an input to the client computing device by a human-interface device, that a user has selected at least a portion of the text already being displayed on the display of the client computing device;

present, in response to the determination that the user has selected text already being displayed on the display of the computing device, a UI element on the display of the client computing device, the UI element comprising a plurality of selectable portions, each selectable portion associated with a distinct speaking action for a 3D avatar to perform with respect to the selected text when that respective selectable portion is selected by the user, wherein (1) the UI element is displayed only after the user has selected the text already being displayed on the display of the client computing device and (2) the UI element lets the user select, via the plurality of selectable portions, which distinct speaking action the 3D avatar will perform regarding the text selected by the user;

in response to the user's selection of a particular one of the plurality of selectable UI portions corresponding to a speaking action, present on the display of the client computing device an animation of the 3D avatar performing the speaking action corresponding to the selected portion; and provide speech audio synchronized with the speaking action of the animated 3D avatar.

18. The system of claim 17, wherein one of the plurality of distinct speaking actions comprises an AI-view action that corresponds to the 3D avatar speaking a comment generated by a trained machine-learning model from the selected text.

19. The system of claim 18, wherein the AI-view action further corresponds to the 3D avatar speaking the selected text after speaking the generated comment.

20. The system of claim 18, wherein, when the UI element corresponding to the AI-view action is selected, the one or more processors are further operable to execute the instructions to:

provide the selected text to the trained machine learning model;

access, from the trained machine learning model, output text paraphrasing the selected text;

generate, from the selected text, one or more feature vectors representing an emotional content of the selected text;

provide the output text and the one or more feature vectors to a transformer model; and receive, from the transformer model, the comment.

* * * * *